United States Patent [19]

Zelent

[11] Patent Number: 4,974,653
[45] Date of Patent: Dec. 4, 1990

[54] TIRE TRACTION DEVICE

[75] Inventor: Leo Zelent, Sherwood Park, Canada

[73] Assignee: Marjorie Ann Zelent, Sherwood Park, Canada

[21] Appl. No.: 279,729

[22] Filed: Dec. 5, 1988

[51] Int. Cl.$^5$ .................. B60C 27/20; B60C 27/04
[52] U.S. Cl. .................. 152/216; 152/218; 152/225 R
[58] Field of Search ............ 152/208, 213 R, 213 A, 152/217, 218, 225 R, 225 C, 216, 219, 233

[56] References Cited

U.S. PATENT DOCUMENTS

| | | | |
|---|---|---|---|
| 2,315,838 | 4/1943 | Bryon | 152/225 R |
| 2,601,882 | 7/1952 | Eisenhauer | 152/225 R |
| 3,079,972 | 3/1963 | Forman | 152/225 R |

*Primary Examiner*—Michael W. Ball
*Assistant Examiner*—Gregory J. Wilber
*Attorney, Agent, or Firm*—Ernest Peter Johnson

[57] ABSTRACT

The device includes a flat rigid rectangular frame forming a pair of opposed parallel sleeves. Four traction elements, each having shank and U-shaped hook portions, are provided for telescoping movement of the shanks within the sleeves, to thereby position the hooks transversely across the tread of the tire. A cable and traveling block/threaded shaft arrangement is provided to simultaneously contract all four traction elements at substantially the same rate into gripping engagement with the tire treads. Crossbars, extending chordally on the inboard side of the tire connect the inner ends of the hooks and secure the device onto the tire. The shanks can rotate within the sleeves so that rotation of the tire can twist the hooks into a slanted condition whereby they more tightly grip the tire.

1 Claim, 1 Drawing Sheet

TIRE TRACTION DEVICE

FIELD OF THE INVENTION

The present invention relates to a tire traction device adapted for mounting on the drive wheels of a motor vehicle or the like.

BACKGROUND OF THE INVENTION

In the event of a vehicle becoming embedded in, for example, mud, or snow, one conventional solution for freeing the vehicle involves the application of a set of chains to the driven tires. The chains function as anti-skid or traction members on the tire. In order, however, to fit the chains onto the tire it is necessary to jack the wheels clear of the ground. It is often difficult, in muddy or yielding terrain, to provide a firm, and hence safe, footing for jack placement. An alternative approach for fitting chains involves driving onto the chains. This, however, is impossible to do once the vehicle is firmly stuck.

A patent search has revealed various traction devices for use in connection with tires. See, for example, U.S. Pat. Nos. 2,315,838; 2,517,634 and 3,437,121.

However, there still exists the need for a tire traction device having the following characteristics:
ease and safety of installation;
simplicity of mechanism;
adaptability for a variety of tire diameters; and
avoidance of damage by the traction device to the tire.

SUMMARY OF THE INVENTION

A device is provided comprising a flat rigid frame which faces on the outer surface of the wheel. Four hook-like elements are provided which may be drawn inwardly by screw-driven means to tightly grip the tread of the tire at points spaced around its periphery. More particularly, a pair of parallel tubular sleeves are mounted on the frame. The shanks of the hooks telescope into the ends of these sleeves. The screw-driven means draw or pull the shanks from their inner ends to clamp onto the tire and hold them in that condition when rotation of the screw is terminated. Crossbars are applied to interconnect the inner ends of the hooks, so that they cannot slip off the tire. The shanks of the hooks can rotate in the sleeves so that when the tire turns, the hooks can adopt a slightly slanted position in which they more tightly grip the tire.

A traction device, adapted for mounting on a vehicle wheel comprising a tire mounted on a rim, said rim having a peripheral edge, said tire having a peripheral tread and inner and outer sidewalls, said device comprising: a generally flat and rigid frame (forming) comprising a pair of parallel sleeves spaced apart a distance about equal to the diameter of the rim so that the sleeves are (so as to be) disposed adjacent the periphery of the rim when mounted on the wheel; first and second pairs of traction members, each such pair being adapted to be inserted into the ends of a sleeve associated therewith, each traction member having a shank and a generally U-shaped hook having a generally straight crosspiece, each shank being free to telescope and rotate within its associated sleeve, the U-shaped hook being adapted to grippingly engage the tread and edge portions of the side walls, whereby the crosspiece will extend transversely across the tread in abutting relationship therewith; a shaft carried by the frame and extending centrally and transversely (thereof) of the parallel sleeves, said shaft being fixed longitudinally to the frame but being adapted to be rotated about its axis, said shaft being externally threaded and carrying an internally threaded apertured travelling block at each of its ends, whereby rotation of the shaft in one direction will move the travelling blocks together along the shaft and, when rotated in the opposite direction, will move them apart; and elongated flexible members, each connecting the end of a shank of a traction member with one of the travelling blocks; whereby when the shaft is rotated in one direction the travelling blocks move together and pull on the shanks axially to draw them inwardly into their associated sleeves at substantially the same rate, to thereby draw the crosspieces into tight gripping engagement, said shaft, travelling blocks and elongated flexible members being operative to retain the hooks in gripping engagement with the tire when the rotation is stopped and, when the shaft is rotated in the opposite direction, to release the traction members for disengagement from the wheel and removal of the device; said flexible members being twistable to ensure the rotational freedom of the shanks connected therewith; and releasable means, adapted to extend along the inner sidewall of the tire, for connecting the inner ends of each pair of hooks, whereby the device may be secured to the tire.

DESCRIPTION OF THE PREFERRED EMBODIMENT

Figure 1:
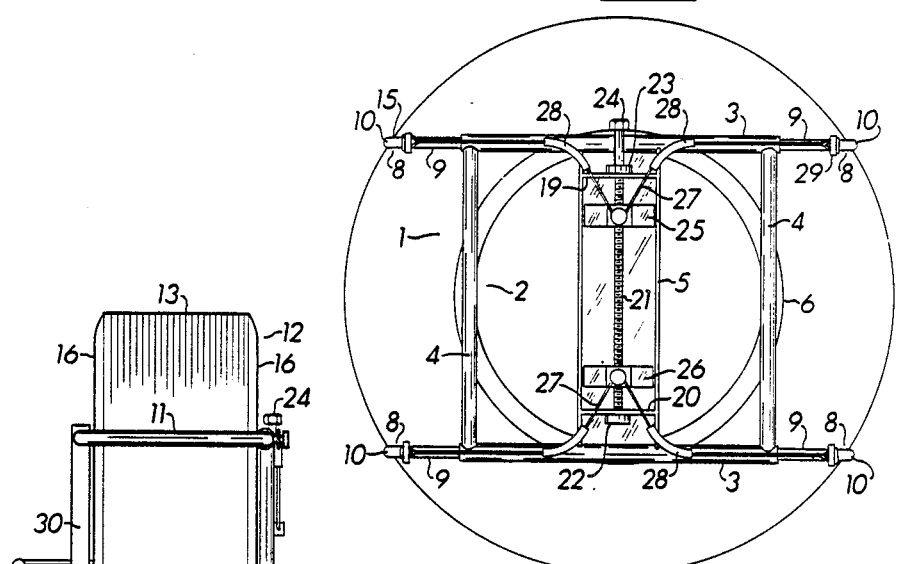
FIG. 1 is a front view of the tire traction device of the present invention.
Figure 2:
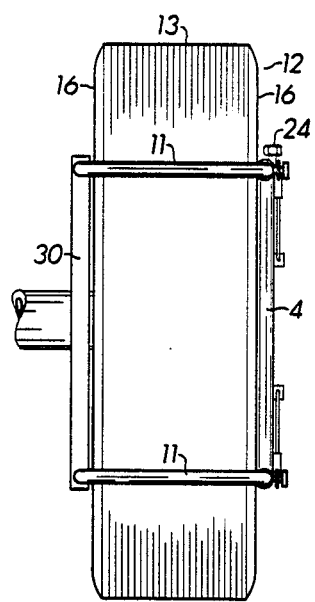
FIG. 2 is a side elevation of the device of FIG. 1.
Figure 3:
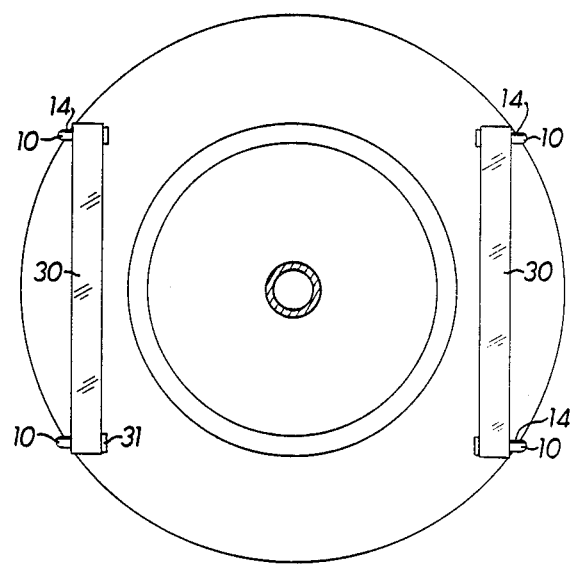
FIG. 3 is a rear view of the device of FIGS. 1 and 2.

Having reference to the accompanying drawings, the tire traction device 1 includes a flat, rectangular, rigid frame 2. The frame 2 comprises a pair of parallel tubular sleeves 3 joined at their ends by a pair of crossbars 4 and intermediate their ends by a channel 5. The sleeves 3 are spaced apart so that they are disposed adjacent opposite edges of the rim 6 of the vehicle 7, when the device is mounted on the wheel.

Four traction members 8 are used in connection with the frame 2. Each such traction member 8 comprises a tubular straight shank 9 and a generally U-shaped hook 10 having a crosspiece 11. The hook 10 is sized to grippingly engage the tire 12 of the vehicle wheel 7. More particularly, when mounted on the tire, each crosspiece 11 extends transversely across the tire tread 13 and the inner and outer ends 14, 15 of the hook snugly engage the side walls 16 of the tire 12. Each of the shanks 9 is connected with the outer end 15 of the hook 10 and extends into an open end of its associated sleeve 3. Each such shank 9 is free to telescope into its sleeve 3 and is free to rotate therein about its longitudinal axis.

The channel 5 has a pair of fixed transverse walls 19, 20 extending thereacross adjacent each of its ends. An externally threaded shaft 21 extends through apertures in the walls 19, 20. The shaft 21 is fixed longitudinally relative to the walls 19, 20 by washers 22, 23. Shaft 21 can be turned by using a wrench on its head 24. Thus the shaft 21 is carried by the frame 2 and extends centrally and transversely thereof, said shaft being fixed longitudinally to the frame but being adapted to be rotated about its longitudinally axis. A pair of internally bored and threaded travelling blocks 25, 26 are positioned on the shaft 21 at its upper and lower ends respectively. The two ends of the shaft 21 are oppositely threaded, so as to cause the travelling blocks 25, 26 to move together when the shaft 21 is rotated in one direction and to move apart when rotated in the opposite direction. A pair of elongated, flexible, twistable members, specifically cables 27, are connected at one end to the upper travelling block 25. Each cable 27 extends through one of the arcuate guides 28 mounted on the frame and is secured to a lug 29 attached to the shank 9 of one of the upper pair of traction members 8. Similarly, a second pair of cables 27 connect the lower travelling block 26 with the shanks 9 of the lower pair of traction members 8.

A pair of elongated crossbars 30 are provided for securing the inner ends 14 of the hook 10, to releasably lock the device 1 on the tire 12. The crossbars 30 extend chordally along the inner wall 16 of the tire 12. Each crossbar 30 comprises end bushings 31 for receiving the hook ends 14.

In operation, the frame 2 is positioned on the tire 12, as shown in FIG. 1. The hooks 10 are in the fully extended state with the travelling blocks 25, 26 in their furthest apart locations. The crossbars 30 are slipped onto the hook ends 14. The shaft 21 is then rotated, to cause the travelling blocks 25, 26 to move together along the shaft threads. The shanks 9 are drawn inwardly simulaneously and at the same rate, thereby bringing the hooks 10 into gripping engagement with the periphery of the tire 12. Thus the cables 27, travelling blocks 25, 26 and threaded shaft 21 cooperate to provide the means for simultaneously contracting the traction members 8 to grip the tire 12 while the device 1 remains centered on the wheel 7. When the device has been tightened onto the wheel and rotation of the shaft 21 has been terminated, said means are operative to retain the hooks 10 in gripping engagement. When the shaft 21 is rotated in the opposite direction, said means are operative to release the traction members 8, following which the device may be disengaged and removed.

By providing rotational freedom of the shanks 9 in the sleeves 3, the traction members 8 may twist a little as the tire rotates, so that the crosspiece 11 is slanted across the tread 13, to thereby provide still a further grip on the tire.

The scope of the invention is set forth in the claim now following.

The embodiments of the invention in which an exclusive property or priviledge is claimed are defined as follows:

1. A traction device, adapted for mounting on a vehicle wheel comprising a tire mounted on a rim, said rim having a peripheral edge, said tire having a peripheral tread and inner and outer sidewalls, said device comprising:

a generally flat and rigid frame comprising a pair of parallel sleeves spaced apart a distance about equal to the diameter of the rim so that the sleeves are disposed adjacent the periphery of the rim when mounted on the wheel;

first and second pairs of traction members, each such pair being adapted to be inserted into the ends of a sleeve associated therewith, each traction member having a shank and a generally U-shaped hook having a generally straight crosspiece, each shank being free to telescope and rotate within its associated sleeve, the U-shaped hook being adapted to grippingly engage the tread and edge portions of the side walls, whereby the crosspiece will extend transversely across the tread in abutting relationship therewith;

a shaft carried by the frame and extending centrally and transversely of the parallel sleeves, said shaft being fixed longitudinally to the frame but being adapted to be rotated about its axis, said shaft being externally threaded and carrying an internally threaded apertured travelling block at each of its ends, whereby rotation of the shaft in one direction will move the travelling blocks together along the shaft and, when rotated in the opposite direction, will move them apart;

and elongated flexible members, each connecting the end of a shank of a traction member with one of the travelling blocks;

whereby when the shaft is rotated in one direction the travelling blocks move together and pull on the shanks axially to draw them inwardly into their associated sleeves at substantially the same rate, to thereby draw the crosspieces into tight gripping engagement, said shaft, travelling blocks and elongated flexible members being operative to retain the hooks in gripping engagement with the tire when the rotation is stopped and, when the shaft is rotated in the opposite direction, to release the traction members for disengagement from the wheel and removal of the device;

said flexible members being twistable to ensure the rotation freedom of the shanks connected therewith; and releasable means, adapted to extend along the inner sidewall of the tire, for connecting the inner ends of each pair of hooks, whereby the device may be secured to the tire.

* * * * *